United States Patent
Shih et al.

(10) Patent No.: US 6,403,911 B1
(45) Date of Patent: Jun. 11, 2002

(54) METHOD AND APPARATUS FOR THE WIRE CUT ELECTRIC DISCHARGE MACHINE

(75) Inventors: Huie-Jan Shih, Taipei; Jih-Jong Hsu, Taichung; Chih-Hsien Chien, Yi Lan; Jui-Fang Liang, Changhua; Yea-June Day, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 11 days.

(21) Appl. No.: 09/667,682

(22) Filed: Sep. 22, 2000

(51) Int. Cl.⁷ .............................................. B23H 7/10
(52) U.S. Cl. .................................................. 219/69.12
(58) Field of Search ........................................ 219/69.12

(56) References Cited

U.S. PATENT DOCUMENTS

| | | | | |
|---|---|---|---|---|
| 4,778,972 A | * | 10/1988 | Josserand | 219/69.12 |
| 5,057,663 A | * | 10/1991 | Kinoshita | 219/69.12 |
| 5,859,401 A | * | 1/1999 | Kajitori et al. | 219/69.12 |
| 6,201,205 B1 | * | 3/2001 | Oshio | 219/69.12 |

FOREIGN PATENT DOCUMENTS

EP          1112799 A2  *  7/2000

* cited by examiner

Primary Examiner—Geoffrey S. Evans
(74) Attorney, Agent, or Firm—Rabin & Berdo, P.C.

(57) ABSTRACT

A wire cutting discharging machining device and the method thereof are disclosed. The method includes the steps of feeding a wire to be machined to a plurality of guide blocks; detecting one end of the wire and positioning the end; driving the plurality of guide blocks and a parallel device which is connected to the plurality of guide blocks and is operated synchronously so as to vertically guide the wire to an upper guide; and feeding the wire continuously to a workpiece, and a lower guide to a drawing roller. When in the process of machining, if a wire is broken abruptly or a machining path is to be updated, then a wire end detecting device, a wire cutting means, a wire end clamping device and a wire pressing device are used to achieve the object of wire modification.

11 Claims, 2 Drawing Sheets

METHOD AND APPARATUS FOR THE WIRE CUT ELECTRIC DISCHARGE MACHINE

BACKGROUND OF THE INVENTION

1. Field of the Invention

The present invention relates to a wire cutting discharging machining device and the method of the same, and especially to a wire cutting discharging machining device and the method for passing, modifying, and cutting wire automatically.

2. Description of the Prior Art

In a prior art wire cutting discharging machining device, when a continuous path is to be machined, the operator need to pass the wire at the initial point of the machining. The wire is passed through an upper guide, a workpiece, a lower guide and finally to a drawing roller for discharging machining. When a predetermined path is complete, as the following machining path is to be used, the wire must be cut manually and then is moved to the initial point of the following machining path for penetration and machining. If the wire is broken in machining, then the deformed or curved wire must be removed manually and then the wire is penetrated again so that the wire can complete a continuous path to continue the machining operation.

Therefore, in the conventional way for wire cutting discharging machining device, other then in the initial operation, the wire must be operated manually, the operator is necessary monitored in the whole process for preventing the wire breaking in the process so as to effect the machining operation.

SUMMARY OF THE INVENTION

Accordingly, the primary object of the present invention is to provide a wire cutting discharging machining method comprising the steps of feeding a wire to be machined to a plurality of guide blocks; detecting one end of the wire and positioning the end; driving the plurality of guide blocks and a parallel means which is connected to the plurality of guide blocks and is operated synchronously so as to vertically guide the wire to an upper guide; and feeding the wire continuously to a workpiece, and a lower guide to a drawing roller. When in the process of machining, if a wire is broken abruptly or a machining path is to be updated, then a wire end detecting device, a wire cutting means, a wire end clamping means can a wire pressing means are used to achieve the object of wire modification.

Another object of the present invention is to provide a wire cutting discharging machining device comprising: a feeding device for feeding a wire to be machined; a plurality of guide block for receiving the wire fed by the feeding device; a parallel means connected to the plurality of guide blocks and operated synchronously therewith; and a driving means for driving the parallel means and guide blocks to protrude out uniformly, guiding the wire to an upper guide so that after the wire passes through a workpiece to a drawing roller, thus, a wire travelling is complete.

The various objects and advantages of the present invention will be more readily understood from the following detailed description when reading in conjunction with the appended drawing.

DETAILED DESCRIPTION OF THE PREFERRED EMBODIMENTS

Figure 1:
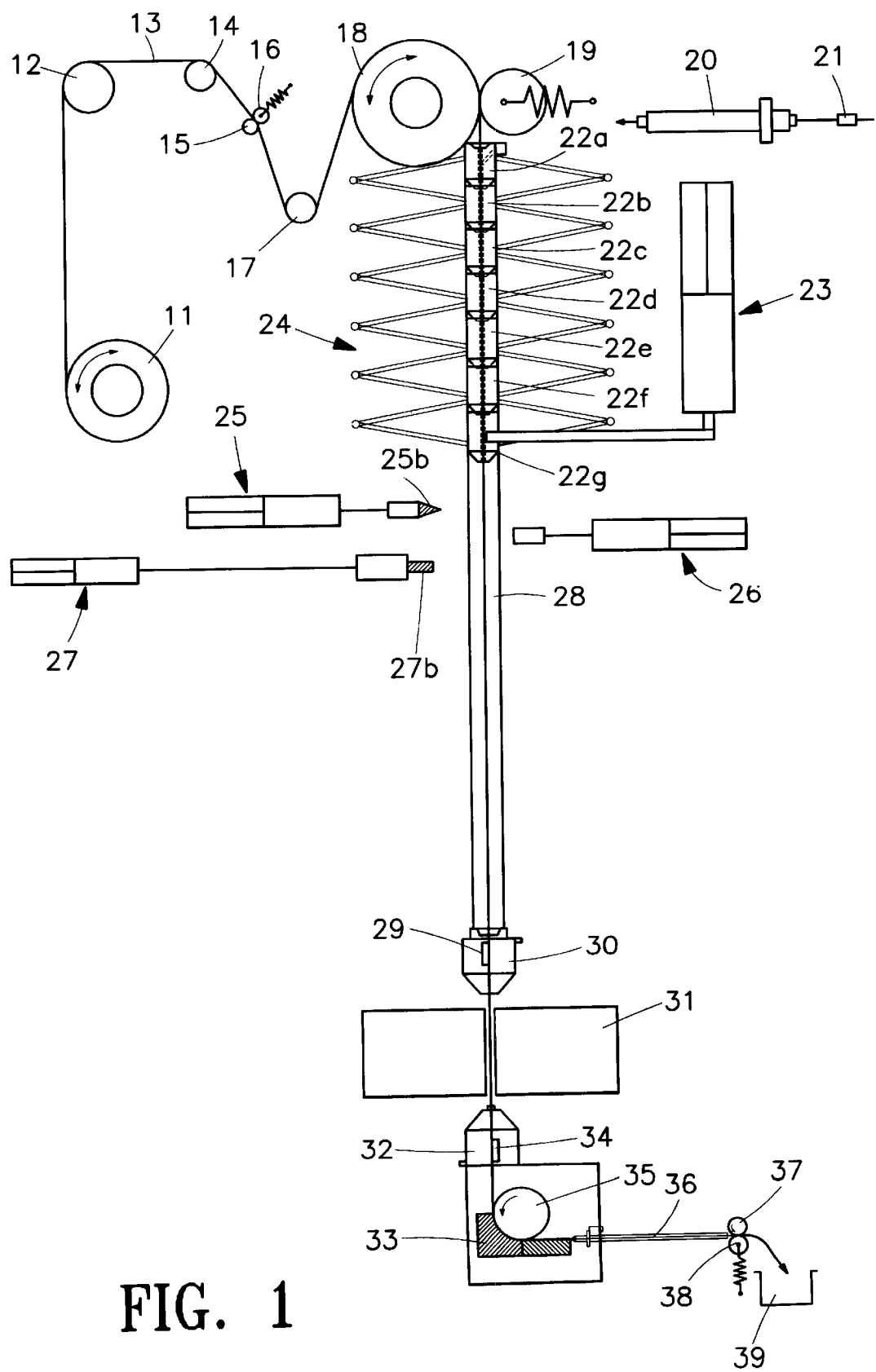
FIG. 1 shows the structure of the wire cutting discharging machining device in which a parallel means is reduced inwards.
Figure 2:
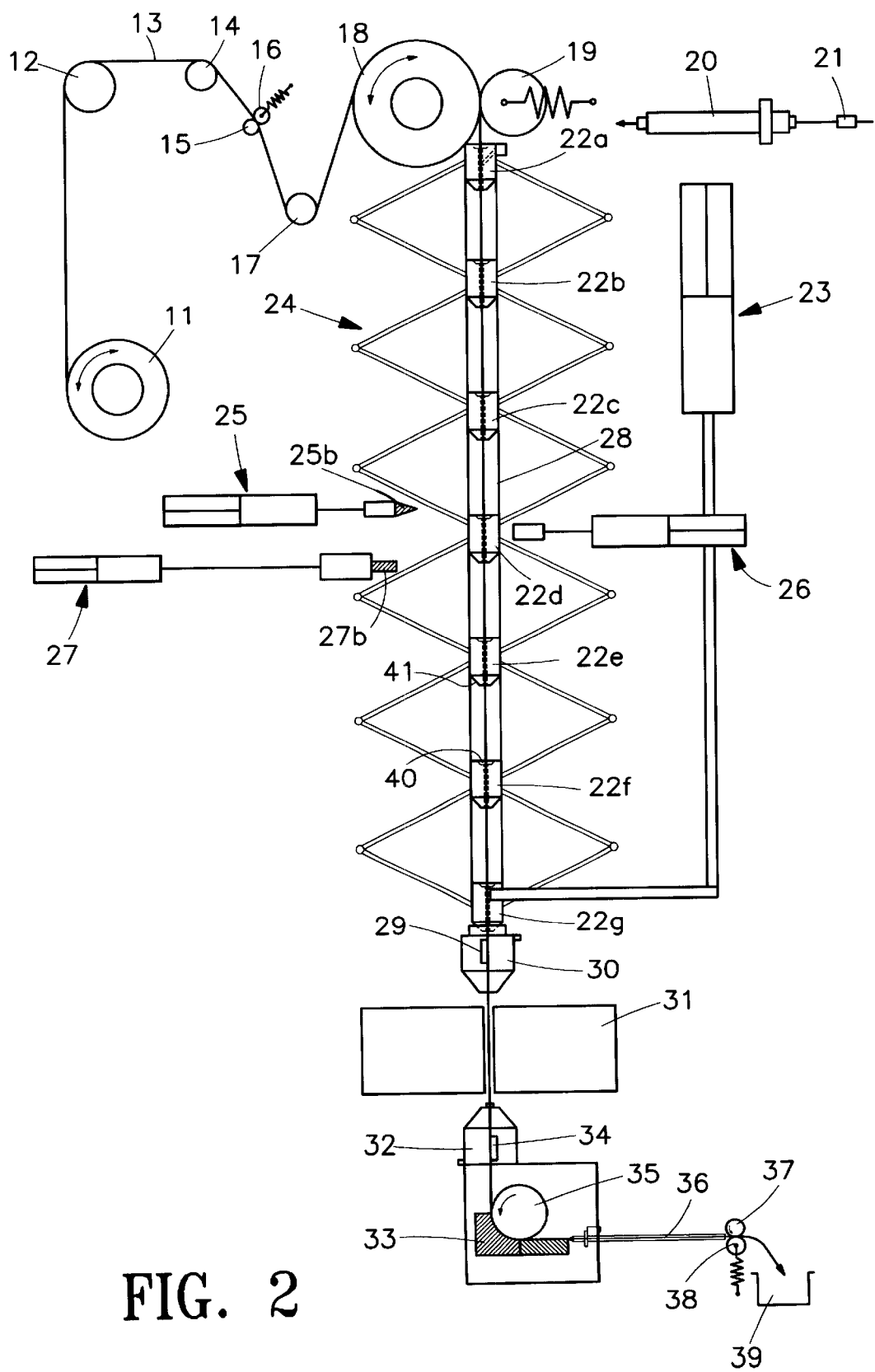
FIG. 2 is similar to FIG. 1, and is a structural schematic view showing that the parallel means protrudes out.

With reference to FIGS. 1 and 2, the wire cutting discharging machining device of the present invention is illustrated. A parallel means 24 serves to stretch vertically a wire 13 to the upper guide 30. The upper guide 30 has a machining fluid therein which is injected to be formed as a fluid pillar to guide the wire 13 passes through a workpiece 31, a lower guide 32 to a drawing roller 37. Thus the action of wire penetration is achieved. While in the process of machining, if wire is cut or the machining path is desired to be updated, an automatic wire repairing device and an automatic wire passing machine are used to achieve the wire head processing and passing.

The automatic wire passing device of the present invention includes a plurality of linear arranged guide blocks 22a to 22g, a parallel means connected to the guide blocks 22a to 22g, a wire clamping device 25, a wire end detector 25b, a guide device 28 and a driving device 23. When a wire 13 passes a plurality of wire guide rollers 12, 14, 15, 16, and 17, two tension rollers 18 and 19 from the wire-storage reel 11 to the first guide block 22a. The tension roller 18 will feed wire automatically so that the wire 13 passes through the central wire holes of each guide blocks 22a to 22g. The wire-storage reel 11, a plurality of wire guide rollers 12, 14, 15, 16, and 17, a tension roller 18 are formed with a feeding device for feeding the wire 13 to the guide blocks 22a to 22g. Each of guide blocks 22a to 22g has an upper portion with a concave chamber 40, and the lower portion thereof has a tapered surface 41 so that two adjacent guide blocks 22a to 22g are matched, and thus as the wire 13 is sent from tension roller 18, the wire 13 is assured to successfully pass through the interfaces of two adjacent guide blocks 22a to 22g.

When the wire 13 is sent to be below the last guide blocks 22a to 22g, it will be sensed by the wire end detector 25. Then, by a driving device 23, for example, a cylinder, the last guide block 22g is driven to be guided by the guide device 28, and then is linearly moved to the last guide block 22g to drive the parallel means 24 to extend to a protruding position of FIG. 2 from a reducing position shown in FIG. 1. The extending parallel means 24 will than drive the other guide blocks 22b to 22f to be moved linearly so that each guide blocks 22b to 22f extends. Therefore, the wire 13 is pulled vertically so as to be achieve the upper guide 30, and then passing through the machining fluid in the interior of the upper guide 30 and guided thereby. Then, the wire passes through the workpiece 31 and lower guide 32 and then passes through a wire guiding seat 33, the wire guiding roller 35, a wire guiding tube 36, and two wire drawing rollers 37 and 38. Then, by conduction of the upper and lower power supply blocks 29 and 34, a discharging machining is performed. Finally, undesired wires are placed in a wire receiving barrel 39.

When a wire is sensed by the wire end detector 25, the parallel means 24 will move downwards with a speed matched to the wire feeding. The parallel means 24 has a speed slight larger than the wire feeding of the tension roller so that the last guide block 22g is in advance to be combined with the upper guide 30 to avoid that the wire end is in contact with the upper guide 30 to be worn or so that the wire end can not be positioned and thus can not be inserted into the upper guide 30.

In the present invention, the parallel means 24 has the function of quick guiding. Only a slight input traveling will induce a large output traveling. Therefore, a driving means with a small traveling can be used. As the parallel means 24 does not guide a wire, it can be compressed for saving space so that other device can be installed conveniently. Further, with the guide of the guide device 28, the positioning is enhanced. The guide device 28 is below the parallel means 24, each guide blocks 22a to 22g slides on the guide device 28 as a sliding track. As the parallel means 24 is driven to move downwards, since the property of the means, each guide blocks 22a to 22g are distributed uniformly, and thus, the wire can be positioned beneficially.

While when a machining path is desired to be updated, after a wire pressing device 26 to position a wire 13, a wire clamping device 25 for cutting wire serves to cut the wire to an upper and a lower half. The lower half is sent to a wire receiving barrel 39 through a wire drawing roller 37. The wire end of the upper half is received by the tension roller 18 and then is positioned by a detecting device 25b. The workpiece 31 is moved to an initial point for succeeding machining. Then, the wire at the upper half is passed automatically by an automatic wire passing device. If the wire is broken abruptly in the machining process, the lower half is similarly sent to the wire receiving barrel 39 through the wire drawing roller 37. The wire at the upper half is received by the tension roller 18. Then a wire of proper length is sent out for assuring to be clamped by the wire clamping device 27. Then, it is positioned by the wire pressing device 26 for assuring the wire to be in a position to be clamped. The clip 27b is driven to be horizontally clamp the wire for preventing the wire to fall down as it is broken. After the wire 13 is clamped, a quality adjusting device 20 generates a high pressure heat gas. The heat gas is guided and then is blown to the last guide block 22g from the lateral side of the first guide block 22a for annealing and the wire end being straightened so that the wire 13 can pass easily through the workpiece 31. The amount of the heat gas is adjusted by a control valve 21. After the annealing is complete, the wire clamping device is positioned. The wire is broken by heating contact for cutting deforming or curved wire. The remained wire is removed by the clamping device 27. Then after an automatic wire modified operation is complete, an automatic wire penetration is performed.

The automatic wire modified device of the present invention serves to machine deformed or curved wire and removed. The deformed wire head is removed to avoid the wearing of the upper guide and lower guide and then wire may pass through the workpiece successfully.

The wire cutting discharging machining device in the present invention has the following advantages:

1. In the wire cutting discharging machining device of the present invention, a parallel means serves to guide a wire, the wire can be successfully guide to, the upper guide and lower guide, as the parallel means is expanded, the guide blocks installed on the parallel means can be uniformly distributed so as to guide the wire completely.

2. The wire cutting discharging machining device of the present invention has the functions of automatic wire breaking and modification, the deformed or curved wire can be cut automatically and removed.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A Wire Cutting Discharging Machining Method, comprising:
   a. feeding a wire to be machined to a plurality of guide blocks;
   b. detecting one end of the wire and positioning the end of the wire;
   c. driving the plurality of guide blocks and a parallel means which is connected to the plurality of guide blocks and is operated synchronously so as to vertically guide the wire to an upper guide; and
   d. feeding the wire continuously to a workpiece, and a lower guide to a drawing roller.

2. The wire cutting discharging machining method as claimed in claim 1, wherein the moving speed of the parallel means is slightly larger than the feeding speed of the wire.

3. The wire cutting discharging machining method, comprising:
   a. feeding a wire to be machined to a plurality of guide blocks;
   b. detecting one end of the wire and positioning the end of the wire;
   c. feeding the wire continuously so that the end of the wire moves to an upper guide;
   d. driving the plurality of guide blocks and a parallel means which is connected to the plurality of guide blocks and is operated synchronously so as to position the wire; and
   e. feeding the wire continuously to a workpiece, and a lower guide to a drawing roller.

4. The wire cutting discharging machining method as claimed in claim 3, further comprising an automatic wire modifying method which includes the following steps:
   f. winding a remained wire to a wire receiving barrel;
   g. detecting one wire end after the wire is broken and positioned;
   h. feeding the wire of a proper length;
   i. positioning and clamping the wire;
   j. cutting a deformed wire;
   k. removing a cutting and deformed wire; and
   l. performing a wire penetrating step again.

5. A wire cutting discharging machining device comprising:
   a feeding device for feeding a wire to be machined;
   a plurality of guide blocks for receiving the wire fed by the feeding device;
   a parallel means connected to the plurality of guide blocks and operated synchronously therewith; and
   a driving means for driving the parallel means and guide blocks to protrude out uniformly, guiding the wire to an upper guide so that after the wire passes through a workpiece to a drawing roller, thus, a wire travelling is complete.

6. The wire cutting discharging machining device as claimed in claim 5, further comprising a guide device for guiding each guide block to be moved linearly.

7. The wire cutting discharging machining device as claimed in claim 5, wherein each guide block has a concave chamber, a lower portion and a tapered surface matched with the concave chamber so that two adjacent guide blocks can be connected tightly.

8. The wire cutting discharging machining device as claimed in claim 5, wherein a wire clamping device is installed at a guide block at a distal end of the guide blocks, as a wire end of the wire is positioned, the wire clamping device clamps the wire, and a tension roller of the feeding device rotates idly; and the parallel means moves downwards to pull the wire.

9. The wire cutting discharging machining device as claimed in claim 5, further comprising an automatic wire modifying device comprising:

a wire end detecting device for detecting one end of the wire and positioning the end;

a wire pressing device for positioning the wire;

a wire cutting device for cutting the wire and removing a deformed wire;

a wire clamping device for clamping a cutting wire; and a quality adjusting device for straightening the wire.

10. The wire cutting discharging machining device as claimed in claim 9, wherein the annealing device cause heat gas to pass therethrough for heating the wire end to achieve the object of annealing and straightening the wire.

11. The wire cutting discharging machining device as claimed in claim 9, wherein in the annealing device, a current is conducted between at least two movable guide blocks for annealing.

* * * * *